United States Patent [19]

Horner et al.

[11] 4,382,217
[45] May 3, 1983

[54] STARTING CONTROL CIRCUIT FOR AN A.C. MOTOR

[75] Inventors: George W. Horner, St. Louis; Vern J. Alway, Ferguson, both of Mo.

[73] Assignee: Gould Inc., Rolling Meadows, Ill.

[21] Appl. No.: 263,967

[22] Filed: May 15, 1981

[51] Int. Cl.³ .............................................. H02P 1/42
[52] U.S. Cl. ................................. 318/778; 318/781; 318/786; 318/799; 318/823
[58] Field of Search ............... 318/767, 772, 778, 779, 318/781, 782, 785, 786, 789, 799, 800, 810, 823, 701, 715, 721, 724, 254 A

[56] References Cited

U.S. PATENT DOCUMENTS

| 3,609,488 | 9/1971 | Sampson | 318/701 X |
|---|---|---|---|
| 3,854,078 | 12/1974 | Hubner | 318/785 X |
| 3,882,364 | 5/1975 | Wright et al. | 318/786 |
| 4,099,103 | 7/1978 | Seeger et al. | 318/715 X |
| 4,099,107 | 7/1978 | Eder | 318/721 X |
| 4,145,646 | 3/1979 | Werderitch | 318/782 |
| 4,314,188 | 2/1982 | Voight | 318/721 |

Primary Examiner—J. V. Truhe
Assistant Examiner—Richard M. Moose
Attorney, Agent, or Firm—Edward E. Sachs

[57] ABSTRACT

A starting control circuit is provided for an alternating current motor having a run winding and a start winding and a mechanical rotational output. The motor is powered by an alternating current source. A reference oscillator produces pulses having a reference frequency. A first control circuit is provided for counting the number of reference pulses produced during a predetermined number of cycles of the alternating current source. A sensor is provided for sensing a predetermined amount of rotational movement of the mechanical rotational output of the motor and producing a sensor pulse indicative thereof. A second control circuit is provided for counting the number of reference pulses produced during the time between a predetermined number of sensor pulses and for comparing the counts on the first and second control circuits. The second control circuit assumes first and second output states dependent on the relationship between the first and second output counts. A switch is connected to the second control circuit, the alternating current source and the start winding for connecting and disconnecting the alternating current source and the start winding in response to the output state of the second control circuit.

36 Claims, 11 Drawing Figures

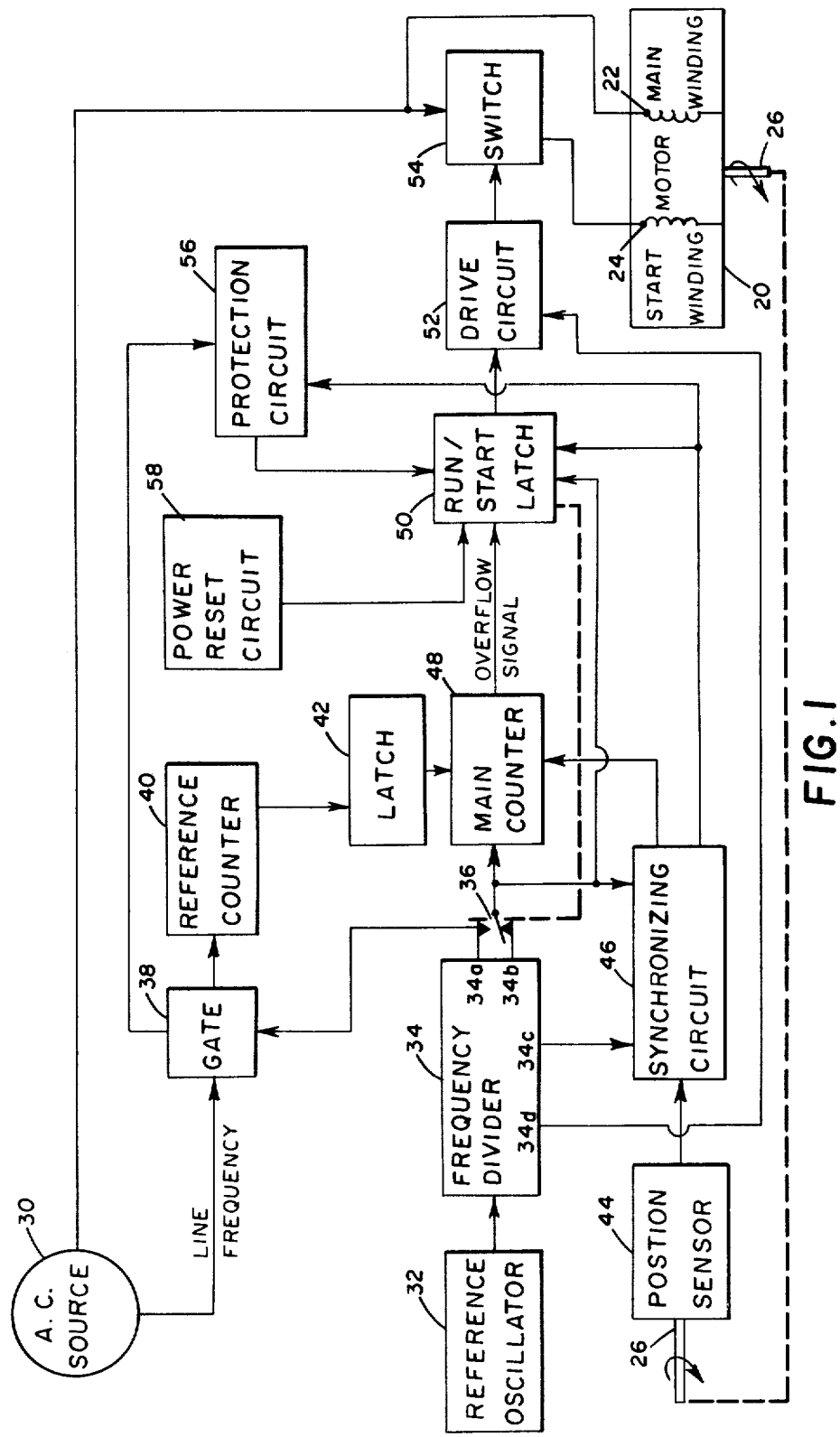

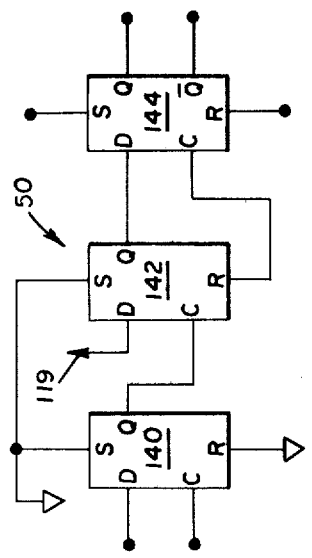
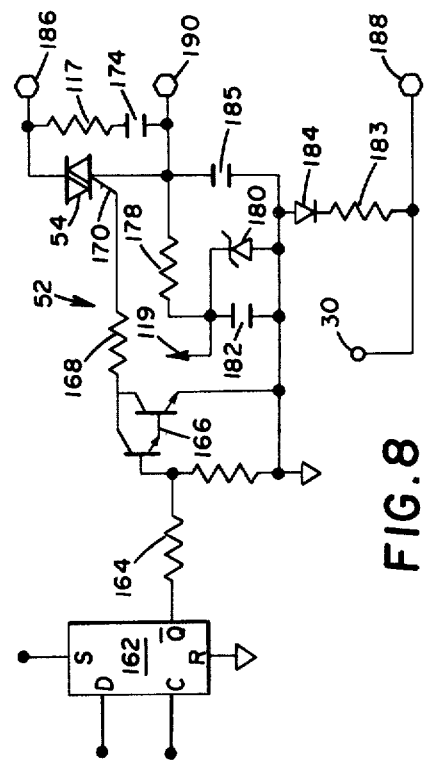
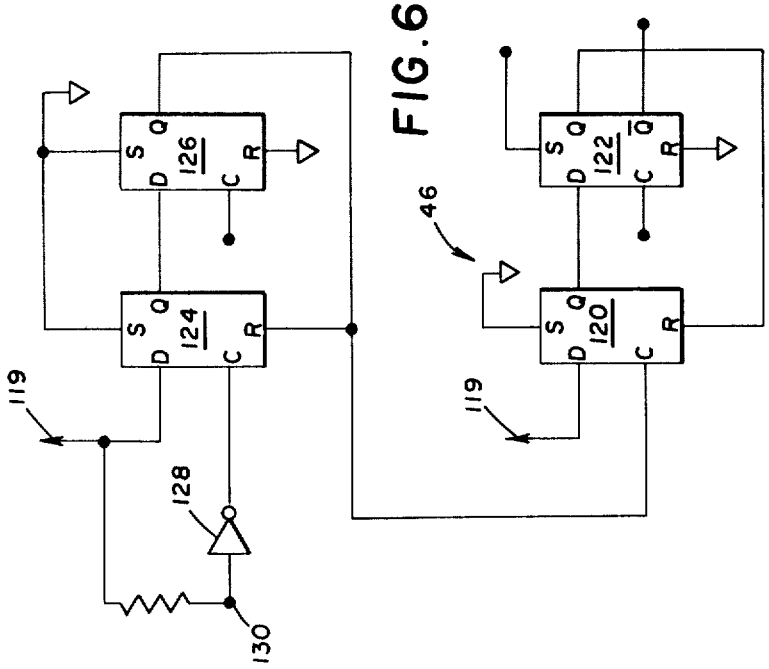
FIG.7
FIG.8
FIG.6

STARTING CONTROL CIRCUIT FOR AN A.C. MOTOR

BACKGROUND OF THE INVENTION

This invention relates generally to control circuits for electric motors and more particularly to an improved electronic starting control circuit for an alternating current motor.

Single phase alternating current motors normally include a start winding in addition to one or more run windings. The start winding and run winding are generally physically displaced from each other on the stator of the motor and carry currents that are displaced in phase. To start such motors, both windings are connected to a single phase alternating current supply line and, because of the phase displacement between their currents, starting torque is developed. As the motor approaches operating speed, it is known that it is desirable to disconnect the start winding from the supply line in order to operate the motor more efficiently. Additionally, since most start windings are designed to be energized for only very short periods of time, they are not designed to carry current for longer periods of time and failure to disconnect the start winding from the alternating current source would probably result in serious damage to the start winding. Heretofore, the disconnection of the start winding from the alternating current source has commonly been accomplished by use of a mechanical centrifugal switch in the start winding circuit. Such mechanical switches are relatively inexpensive devices but have a life span which is usually substantially shorter than the life span of various electronic switching devices. In order to take advantage of the longer life span of electronic switching devices, voltage and current relays including solid state switches have been utilized to disconnect the start winding from the alternating current source. However, this approach to disconnecting motor start windings has the disadvantage that for different size motors, different circuits must be utilized. As a result, this solution has proved to be uneconomical.

Yet another approach to solving the problem is that illustrated in U.S. Pat. No. 3,882,364 to Floyd H. Wright, et al. entitled "Induction Motor Control System." This patent suggests the use of a sensing coil positioned on one of the stator poles to develop a speed responsive control signal resulting from flux variation, or slot ripple, resulting from the moving rotor teeth. This ripple voltage is then amplified, filtered and compared to a reference voltage to determine when to trigger a triac switch in the start winding circuit to disconnect the start winding from the alternating current source. This approach has several problems associated with it. First, the addition of a sensing winding to the motor pole is a complicated and costly manufacturing step. Second, it is a common practice in the manufacture of induction motors to skew (helically twist) the rotor slots in order to minimize the cogging torque particularly on starting. Such skewing would render the sensing approach suggested in this patent virtually useless because the amplitude of the ripple voltage would be substantially masked by noise. Finally, it is further known that for most rotors it is desirable to close the rotor slots to minimize ripple problems. Since the approach suggested in this patent requires the use of a toothed rotor, such a closed slot construction would render this approach once again relatively useless.

SUMMARY OF THE INVENTION

Thus, in accordance with the present invention, a starting control circuit is provided with an alternating current motor having a run winding and a start winding and a mechanical rotational output. The motor is powered by an alternating current source. A reference oscillator produces pulses having a reference frequency. A first control circuit is provided for counting the number of reference pulses produced during a predetermined number of cycles of the alternating current source. A sensor is provided for sensing a predetermined amount of rotational movement of the mechanical rotational output of the motor and producing a sensor pulse indicative thereof. A second control circuit is provided for counting the number of reference pulses produced during the time between the predetermined number of sensor pulses and for comparing the counts on the first and second control circuits. The second control circuit assumes first and second output states dependent on the relationship between the first and second output counts. A switch is connected to the second control circuit, the alternating current source and the start winding for connecting and disconnecting the alternating current source and the start winding in response to the output state of the second control circuit.

An object of the present invention is the provision of a starting control circuit for an alternating current motor which utilizes electronic components in both an accurate and an economical fashion.

Another object of the present invention is the provision of a starting control circuit for an alternating current motor which may be utilized over a wide range of motor sizes and with motors having a wide range in the number of motor poles.

A still further object of the present invention is the provision of a starting control circuit for an alternating current motor which will operate accurately over a wide range of line frequencies.

Another object of the present invention is the provision of a starting control circuit for an alternating current motor which will operate accurately over a wide range of motor voltages.

Yet another object of the present invention is the provision of a starting control circuit for an alternating current motor which utilizes relatively little electrical power.

Other objects, advantages, and novel features of the present invention will become apparent from the following detailed description of the invention when considered in conjunction with the accompanying drawings.

BRIEF DESCRIPTION OF THE DRAWINGS

FIG. 1 shows the starting control circuit of the present invention in block diagram form;

FIG. 6 shows a detailed circuit diagram of the synchronizing circuit utilized in the starting control circuit of the present invention;

FIG. 7 shows a detailed circuit diagram of the run-start latch circuit utilized in the starting control circuit of the present invention;

FIG. 8 shows a detailed circuit diagram of the drive circuit, power supply and switch utilized in the starting control circuit of the present invention;

DESCRIPTION OF THE PREFERRED EMBODIMENT

Figure 3:
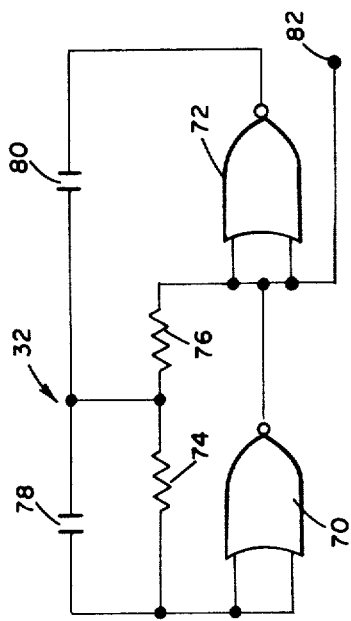
FIG. 3 shows a detailed circuit diagram of the reference oscillator utilized in the starting control circuit of the present invention.

Referring now to the drawings, the preferred embodiment of the present invention will be described in detail.

In FIG. 1, an alternating current motor 20 includes a main or run winding 22, a start winding 24 and a mechanical rotational output 26. Although it is not shown in the drawings, it should be understood by those skilled in the art that a capacitor may be placed in series with the start winding 24 to further increase the phase displacement of currents between windings 22 and 24, in a known manner. The motor 20 is powered by an alternating current source 30. Reference means are provided for producing a reference signal. The reference means is preferably a reference oscillator 32 for producing an output at a first or reference frequency. A detailed circuit diagram of the reference oscillator 32 is shown in FIG. 3, however, as will become apparent from the discussion of the operation of the circuit of the present invention, any known oscillator circuit can be utilized.

In the preferred embodiment of the present invention, the reference oscillator 32 has an output frequency of approximately $3.3 \times 10^5$ Hz. This output reference frequency was chosen only as a convenience so that the circuit of the present invention could optimize its use of known, commercially available circuit components. The circuit of the present invention could work equally well over a very broad range of reference signals, for example, in the range of $1 \times 10^3$ Hz to $1 \times 10^7$ Hz. The output from the oscillator 32 is delivered to a frequency divider 34. The frequency divider 34 serves to convert the first frequency output of the reference oscillator into a pair of signals having second and third frequencies. The function of the frequency divider 34 is to create a desired ratio between a pair of outputs 34a and 34b and to reduce the absolute count from the reference oscillator 32 to a level which may be practically utilized by the remainder of the circuit components. In the event that a reference oscillator were used that produced an output at a usable frequency, it is possible that one of the outputs of the frequency divider 34 could be identical to that of the reference oscillator 32. The frequency divider 34 includes an output switch 36 shown in detail in FIG. 4. The frequency divider 34 also converts the first frequency output of the reference oscillator 32 into a signal having a fourth frequency delivered at output 34c and a signal having a fifth frequency delivered at output 34d.

A first control means is provided responsive to the reference signal produced by the reference oscillator 32 and the frequency of the alternating current source 30 for producing a first control signal. The first control means includes a gate circuit 38, shown in detail in FIG. 5, for receiving one of the output signals from the frequency divider 34 and a frequency signal indicative of the frequency of the alternating current source 30. The gate 38 then delivers to a reference counter 40 all the reference pulses produced by the frequency divider 34 on output 34a during each cycle of the alternating current source 30. It should be understood that the gate 38 and the circuit of the present invention could be designed to count all the pulses produced during any multiple or fraction of a cycle of alternating current produced by alternating current source 30. The reference counter 40 is part of a first counting means for counting the number of reference pulses produced during a predetermined number of cycles of the alternating current source. The first counting means further includes a latch circuit 42 for both storing the count of the number of reference pulses produced in the counter 40 and for converting the output from the counter 40 to the complement or digital inversion of that count.

Sensor means are provided in the form of a position sensor 44 for sensing a predetermined amount of rotational movement of the mechanical rotational output 26 and producing a sensor pulse indicative thereof. The position sensor 44 includes a magnet wheel and a Hall Effect detection circuit shown in detail in FIG. 2. Briefly, the position sensor 44 serves to provide an output pulse with each predetermined amount of rotation of the motor output 26, depending on the number of poles in motor 20.

In the preferred embodiment of the present invention, the position sensor 44 is designed to produce a number of output pulses equal to the number of motor poles for each 360 degrees of rotation of the mechanical rotational output 26. For example, in a motor having n poles, the sensor 44 would be designed to produce an output pulse with each $360 \div n$ degrees of rotation of the mechanical rotational output 26.

Second control means are provided responsive to the reference signal produced by reference oscillator 32 and the sensor signal produced by position sensor 44 for producing a second control signal and for comparing the first and second control signals and assuming first and second output states dependent on the relationship between the first and second control signals. The second control means includes a synchronizing circuit 46 connected to the position sensor 44 and the frequency divider 34 for synchronizing the sensor pulses with the reference pulses and delivering a synchronized sensor pulse signal to a second counting means, main counter 48. The synchronizing circuit 46 is connected to the output of switch 36 and to the output terminal 34c of frequency divider 34 and serves to avoid partial pulses being transmitted to main counter 48. The synchronizing circuit 46 accepts only the first full pulse from switch 36 and thus serves as a synchronized gate. A detailed circuit diagram of the synchronizing circuit 46 is shown in FIG. 6. The main counter 48 counts the number of reference pulses delivered to counter 48 by frequency divider 34 at either terminal 34a or 34b during the time between adjacent synchronized sensor pulses. The factor determining whether main counter 48 is connected to terminal 34a or 34b of frequency divider 34 is whether the circuit is in the run mode or the start mode, as will be discussed later. Main counter 48 is also connected to latch circuit 42 for receiving the output from latch circuit 42. As was mentioned previously, the count in latch circuit 42 is the complement of the count in reference counter 40. Thus, the circuit is designed so that when the sum of the counts in latch circuit 42 and main counter 48 exceeds the capacity of main counter 48, an overflow output signal will be delivered by main counter 48 to a run-start latch circuit 50.

The run-start latch circuit produces first and second output signals in response to the presence or absence of an overflow signal from the main counter 48. The first output signal of the run-start latch circuit 50 is connected to a drive circuit 52 and determines whether the drive circuit 52 will deliver gating pulses to a switch 54. The second output signal from the run-start latch 50 is delivered to switch 36 of frequency divider 34 to determine which of the output signals from frequency divider 54 should be delivered to main counter 48. This, in turn, determines whether the circuit is operating in the run mode or the start mode. The run-start latch circuit 50 also receives input signals from switch 36 and synchronizing circuit 46 for reasons which will be discussed later. A detailed circuit diagram of the run-start latch circuit 50 is shown in FIG. 7.

The drive circuit 52, shown in detail in FIG. 8, produces a plurality of gating pulses to the switch 54 during each cycle of the alternating current source 30, in response to receiving the first output signal from the run-start latch circuit 50. The drive circuit 52 also receives an input signal from output 34d of frequency divider 34 for reasons which will be discussed later. The switch 54, which is preferably a triac, is connected to the drive circuit 52, the alternating current source 30 and the start winding 24 for connecting and disconnecting the alternating current source 30 from the start winding 24 in response to the output state of main counter 48. A protection circuit 56 is provided to deenergize the circuit in the event the motor stalls upon being energized. The protection circuit 56 is connected to gate circuit 38 and run-start latch circuit 50 and receives a synchronized sensed pulse signal from synchronizing circuit 46.

Figure 9:
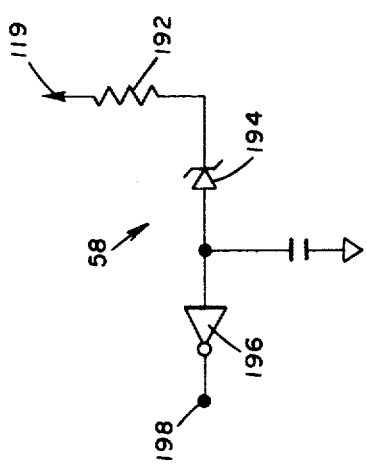
FIG. 9 shows a detailed circuit diagram of the power-on reset circuit utilized in the starting control circuit of the present invention.

A power-on reset circuit 58 is provided for delivering a signal to the run-start latch circuit 50 when the alternating current source 30 is first connected to the circuit. The signal delivered to run-start latch circuit 50 from power-on reset circuit 58 causes the run-start latch circuit 50 to initially deliver a signal to drive circuit 52 in turn causing drive circuit 52 to provide gating pulses to the switch 54 and also to deliver a signal to switch 36 closing the switch 36 to assume the start mode. A detailed circuit diagram of the power-on reset circuit 58 is shown in FIG. 9.

In operation, from the quiescent state, motor 20 may be coupled to alternating current source 30 by closing a manual switch (not shown). Main winding 22 of motor 20 is thus energized. All of the control circuitry is also simultaneously energized. The power-on reset circuit 58 delivers a signal to the run-start latch circuit 50. The run-start latch circuit 50 then delivers a first output signal to drive circuit 52 causing drive circuit 52 to, in turn, deliver a plurality of gating pulses to switch 54. Upon receipt of the gating signals from drive circuit 52, switch 54 is closed, energizing start winding 24. Simultaneously, run-start latch circuit 50 delivers a signal to switch 36 to cause switch 36 to connect terminal 34b of frequency divider 34 to main counter 48, thus placing the circuit in the start mode of operation. Reference oscillator 32 begins producing reference pulses at a reference frequency. Frequency divider 34 then divides the output from reference oscillator 32 into two output references signals one divided by a constant a and the other divided by a constant b. In the preferred embodiment of this invention, constant a is 64 and constant b is 40.

Thus, the first reference signal ($f_{osc} \div 64$) is delivered to the gate circuit 38. The gate circuit 38 then permits all pulses produced during a single cycle of line frequency to be delivered to reference counter 40. The output from reference counter 40 for each cycle is stored in latch 42 and converted to the complementary count.

Simultaneously, as mechanical rotational output 26 of motor 20 starts to turn, position sensor 44 starts to produce output pulses indicative of the movement of rotational output 26. The output pulses from position sensor 44 are synchronized with those in the frequency divider 34 and then delivered to main counter 48. Since switch 36 of frequency divider 34 is in the start mode, main counter 48 receives the second reference frequency signal from frequency divider 34 which is the reference frequency from oscillator 32 divided by a constant b ($f_{osc} \div 40$). When the sum of the counts in main counter 48 and latch circuit 42 exceeds the capacity of main counter 48, an overflow signal is delivered to run-start latch circuit 50. In its intial stages of movement, the mechanical rotational output 26 of motor 20 will be far below the desired operating speed and as a result, a relatively long time will elapse between output pulses from position sensor 44. As a result of the long time period between output pulses from position sensor 44, a large number of pulses from terminal 34b are delivered to main counter 48 between synchronized sensed pulses from synchronizing circuit 46. This assures that when the motor is operating slowly an overflow signal will be delivered from main counter 48 to run-start latch circuit 50. As the motor speed increases, the time period between successive output pulses from position sensor 44 decreases, and correspondingly, the number of sensed pulses delivered to main counter 48 from terminal 34b decreases. The circuit is designed so that, preferably, the main counter 48 is not filled to capacity and therefore no overflow signal is delivered to run-start latch circuit 50 when the motor achieves approximately 80% of its synchronous speed.

It should be noted that the main counter 48 operates as a comparator with the help of latch circuit 42. Since the latch circuit 42 converts the output from reference counter 40 to the complement of that count, the main counter 48 only drops below its capacity when the sensed count from synchronizing circuit 46 drops below the stored reference count from counter 40. Thus, the position sensor 44, the synchronizing circuit 46, the gate 38, the reference counter 40 and the latch 42 in combination with main counter 48 effectuate a control means which operates independently of any particular line frequency and any particular reference frequency for assuming a first output state when the output speed of mechanical rotational output 26 is below a predetermined level and for assuming a second output state when the output speed of the mechanical rotational output 26 exceeds that predetermined level. This will become apparent when examining the relationship of these control circuits with the variables being defined as follows:

f = the frequency of the alternating current source 30
$f_{osc}$ = the output frequency of the reference oscillator 32
S = motor speed as a fraction of synchronous motor speed The circuit is then governed by the following relationship:

$$\left(\frac{f_{osc}}{b}\right)\left(\frac{1}{2Sf}\right) > \frac{f_{osc}}{af}, \text{ or, } \frac{1}{2bS} > \frac{1}{a}$$

Thus, is S is smaller than a ÷2b the main counter 48 continues to produce an overflow signal. It is thus apparent that the value of S at which switching occurs is independent of line frequency and any particular reference frequency and is determined solely by the ratio of constants a and b set up in frequency divider 34. In the preferred embodiment of the present invention, where a is 64 and b is 40, it will thus become apparent that S is 0.8 and that as a result the circuit is designed to terminate the start mode when motor 20 achieves approximately 80% of synchronous speed. However, until the motor achieves 80% of synchronous speed, an overflow signal is delivered to run-start latch circuit 50.

The run-start latch circuit 50 receives an interrogation signal from synchronizing circuit 46 indicating when a cycle has ended. If the run-start latch circuit 50 does not receive a corresponding overflow signal from main counter 48, the run-start latch circuit 50 delivers an output signal to drive circuit 52 causing the drive circuit 52 to cease delivering gating pulses to the switch 54. However, in the initital stages of the starting cycle, the run-start latch circuit 50 receives an overflow signal from main counter 48 and simultaneously delivers a first output signal to drive circuit 52 and a second output signal to switch 36 of frequency divider 34. Upon receipt of the first output signal from run-start latch circuit 50, the drive circuit 52 continues to produce a plurality of gating signals to switch 54 to thereby maintain switch 54 in a closed position and maintain energization of start winding 24. The second output signal from run-start latch circuit 50 causes switch 36 to be maintained in the start position as discussed previously.

The drive circuit 52 receives a signal from output 34d of frequency divider 34 which is preferably equal to one-half the frequency output of reference oscillator 32. The drive circuit 52 is designed to deliver negative gating pulses having a duration equal to 2 cycles of the reference oscillator 32. The drive circuit 52 further delivers such negative gating pulses every 64 cycles of the reference oscillator 32. Accordingly, for a reference oscillator having an approximate output of $3.3 \times 10^5$ Hz. the drive circuit 52 functions to provide negative gating pulses having a duration of approximately 3 microseconds at approximately 190 microsecond intervals whenever the circuit is operating in the start mode. This gating technique minimizes the power needed to drive the switch 54 while at the same time enabling the circuit to respond very quickly to either energize or deenergize the start winding 24.

Once the mechanical rotational output 26 of motor 20 achieves 80% of operating speed, the circuit of the present invention is designed so that the count of reference pulses received by main counter 48 between pulses from synchronizing circuit 46 will be equal to the count of reference pulses received by latch circuit 42 from reference counter 40. Once the count of reference pulses received by main counter 48 between output pulses from synchronizing circuit 46 drops below the count received by latch circuit 42 from reference counter 40, the main counter 48 will cease to produce an overflow signal. As was mentioned before, once the overflow signal from main counter 48 ceases, the run-start latch circuit 50 delivers a signal to drive circuit 52 which causes the drive circuit 52 to cease delivering gating pulses to the switch 54. Since switch 54 is preferably a triac, the absence of gating pulses permits the triac to turn off when the alternating current from source 30 goes through the zero current level. The start winding 24 is thus deenergized.

Simultaneously with the cessation of an overflow signal being delivered from main counter 48 to run-start latch circuit 50, run-start latch circuit 50 changes the state of its output signal to switch 36, causing switch 36 to be connected to terminal 34a of frequency divider 34. This causes the control circuit of the present invention to assume the run mode of operation. In the run mode of operation, the circuit of the present invention is preferably designed so that the main counter 48 will not produce an overflow signal and therefore the start winding 24 will not be reenergized until the mechanical rotational output 26 of motor 20 drops below 50% of normal operating speed. This is evident since both the reference counter 40 and the main counter 48 receive the same output from frequency divider 34. As a result, the circuit is controlled by the following relationship:

$$(1/2aS) > (1/a)$$

From this it is evident that the start winding will not be reenergized until S is less than 0.5.

The protection circuit 56 is designed so that energization of start winding 24 will be terminated and the entire control circuit will be overridden if the mechanical rotational ouput 26 fails to rotate at least 360° ÷ n within the first 256 cycles of alternating current from alternating current source 30. In effect, this means that unless the protection circuit 56 senses movement on the part of the motor within approximately the first four seconds of operation, i.e., receives a reset pulse from synchronizing circuit 46, energization of the start winding will be terminated.

Some of the significant features of the starting control circuit of the present invention will now be highlighted. Since both the reference counter 40 and the main counter 48 receive their input count from a common reference pulse source, reference oscillator 32 and frequency divider 34, the starting control circuit of the present invention is independent of the particular frequency of the alternating current source. It is important only that the reference oscillator 32 have very short term stability for the circuit to operate accurately. The circuit of the present invention can operate with alternating current sources ranging from 25 to 120 Hz. Additionally, the control circuit of the present invention may be used with motors of all operating speeds. If the number of motor poles changes, only the position sensor 44 need be changed to adapt the circuit of the present invention. The circuit will also operate properly over a wide range of motor voltages, e.g., 30 volts to 150 volts and with motors having any number of motor poles. All of these features can be attributed to the use of a common reference oscillator for both the reference and sensing circuits.

It should further be apparent from the above discussion that the starting control circuit of the present invention includes a built-in hysteresis effect since the start winding 24 is deenergized when the motor reaches 80% of synchronous speed but is not reenergized until the motor drops below 50% of synchronous speed. Furthermore, the energization and deenergization points for start winding 24 are determined entirely by selecting the relative outputs delivered to main counter 48 and reference counter 40. Thus, by merely changing the ratio between constants a and b one may change the control characteristics of the circuit.

It should be understood that although in the preferred embodiment of the present invention a digital control circuit has been described, that it is within the scope of the present invention to utilize an equivalent analog control circuit for accomplishing the same end. For example, an equivalent analog circuit would utilize a ramp generator as a reference source coupled with a reference integrator and a sensed integrator. the outputs of the two integrators could then be compared to determine if the start winding should be deenergized.

Figure 2:
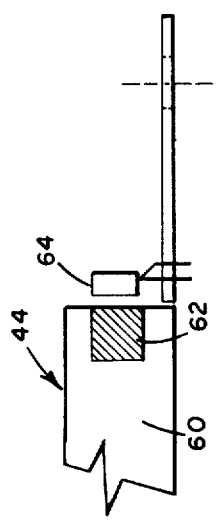
FIG. 2 shows a top view of the position sensor of the present invention.

FIG. 2 shows a position sensor suitable for use with the circuit of the present invention. A disc or wheel 60 has one or more magnets 62 mounted in cooperative relationship with the disc and with a Hall Effect detection circuit 64 to activate the Hall Effect detection circuit when the disc completes a predetermined amount of rotational movement. The disc 60 is mounted concentrically on mechanical rotational output 26 of motor 20 and adapted to rotate therewith. In the preferred embodiment, the disc 60 includes two magnets for a two pole motor and four magnets for a four pole motor. It should be understood that a variety of alternative position sensors could be utilized with the control circuit of the present invention. For example, a stationary single magnet could be mounted within a hollow notched wheel such that the circumference of the wheel would be interposed between the detection circuit and the magnet until the notch appeared. Thus, rather than having a plurality of magnets, a plurality of notches or openings in the surface of the wheel could be utilized to trigger the detection circuit. In addition, instead of Hall Effect detection circuits, it is well within the scope of the present invention to utilize other pickups such as capacitive or optical devices to detect the position of the mechanical rotational output of the motor 20. Hall Effect detection circuit 64 is preferably a type UGN-3019T or UGS-3019T digital switch manufactured by the Semiconductor Division of Sprague Electric Co., Concord, NH.

FIG. 3 shows a detailed circuit diagram of the reference oscillator utilized in the starting control circuit of the present invention. The oscillator includes a pair of NOR gates 70 and 72 associated with RC circuits formed of resistors 74 and 76 and capacitors 78 and 80, respectively. Terminal 82 is connected to the clock terminal of frequency divider 34.

Figure 4:
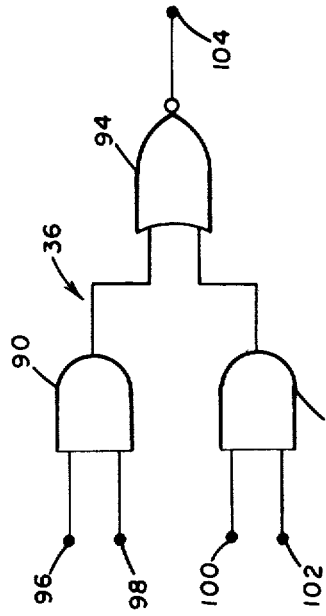
FIG. 4 shows a detailed circuit diagram of a switching circuit utilized in the starting control circuit of the present invention.

FIG. 4 shows a detailed circuit diagram of a switching circuit symbolically illustrated as the switch 36 in FIG. 1. A pair of AND gates 90 and 92 are coupled to a NOR gate 94. Inputs to AND gate 90 are received at terminal 96 from the run-start latch circuit 50 and at terminal 98 from the frequency divider 34. Inputs to AND gate 92 are received at terminal 100 from frequency divider 34 and at terminal 102 from run-start latch circuit 50. The output from terminal 104 of NOR gate 94 is delivered to synchronizing circuit 46 and inverted and delivered to run-start latch circuit 50 and the clock terminal of main counter 48.

Figure 5:
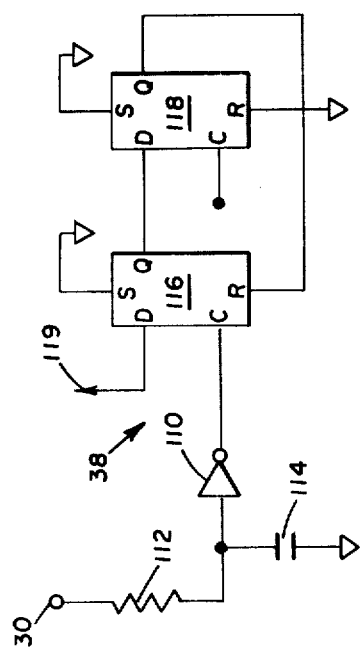
FIG. 5 shows a detailed circuit diagram of a gate circuit utilized in the starting control circuit of the present invention.

FIG. 5 shows a detailed circuit diagram of a gate circuit suitable for use in the starting control circuit of the present invention. An inverter 110 is coupled to the AC source 30 through a resistor 112. The input is filtered by capacitor 114 and the output from the inverter 110 is delivered to a pair of FLIP-FLOP circuits 116 and 118. FLIP-FLOP circuits 116 and 118 and all of the FLIP-FLOP circuits utilized in the preferred embodiment of the starting control circuit of the present invention are D-type FLIP-FLOPs. In such circuits, the following symbols are utilized to represent the terminals indicated: S represents the set terminal, D represents the data input terminal, C represents the clock terminal, R represents the reset terminal, Q represents the output terminal, and Q represents the complementary output terminal. The output terminal of FLIP-FLOP 118 and the reset terminal of FLIP-FLOP 116 are connected to both the reset terminal of counter 40 and the clock terminal of latch 42. The clock terminal of FLIP-FLOP 118 is connected to output terminal 34a of frequency divider 34. The data input terminal of FLIP-FLOP 116 is connected to the DC power supply terminal 119. The reset terminal of FLIP-FLOP 118 is connected to the circuit ground.

FIG. 6 shows a detailed circuit diagram of the synchronizing circuit utilized to synchronize the output pulses from position sensor 40 with the reference pulses in frequency divider 34. The synchronizing circuit 46 consists of FLIP-FLOPs 120 and 122, 124 and 126. The clock terminal of FLIP-FLOP 124 is connected to the output from the Hall Effect detection circuit 64 through amplifier and inverter 128. The clock terminal of FLIP-FLOP 126 is connected to terminal 34c of frequency divider 34. The output terminal of FLIP-FLOP 122 is connected to run-start latch circuit 50 and to the reset terminal of protection circuit 56. Complementary output terminal of FLIP-FLOP 122 is connected to the complementary load terminal of main counter 48. The clock terminal of FLIP-FLOP 122 is connected to output terminal 104 of switching circuit 36. The set terminal of FLIP-FLOP 122 is connected to the output terminal of power-on reset circuit 58. The input terminal 130 of amplifier and inverter 128 is connected to the output of the Hall Effect detection circuit 64.

FIG. 7 shows a detailed circuit diagram of the run-start latch circuit 50. The run-start latch circuit 50 includes three FLIP-FLOPs 140, 142 and 144. The data input terminal of FLIP-FLOP 140 is connected to the carry terminal of main counter 48 for receiving the overflow signal therefrom. The clock terminal of FLIP-FLOP 140 is connected to the inverted output of switch 36. The reset terminal of FLIP-FLOP 142 and the clock terminal of FLIP-FLOP 144 are connected to the output terminal of FLIP-FLOP 122 in synchronizing circuit 46. The set terminal of FLIP-FLOP 144 is connected to the output of the power-on reset circuit 58. The reset terminal of FLIP-FLOP 144 is connected to the output from protection circuit 56. The output terminal of FLIP-FLOP 144 is connected to protection circuit 58 and also connected to terminal 96 of switching circuit 36. The complementary output terminal of FLIP-FLOP 144 is connected to terminal 102 of switching circuit 36, to drive circuit 52, and to an indicating circuit.

FIG. 8 shows a detailed circuit diagram of drive circuit 52 and switch 54. The drive circuit 52 is coupled to the complementary output terminal of FLIP-FLOP 144 in run-start latch circuit 50 through the data input terminal of FLIP-FLOP 162. The output terminal of FLIP-FLOP 162 is connected through resistor 164 to a Darlington pair of switching transistors 166. The output from transistors 166 delivers negative gating pulses through resistor 168 to gate terminal 170 of triac 54. A resistor 172 and capacitor 174 form an RC filter across triac 54. Power for the entire circuit is delivered to terminal 176 by resistors 178 and 183, diode 184 and capacitor 185. The zener diode 180 regulates power to the circuit. Transient spikes are filtered by capacitor 182. The clock terminal of FLIP-FLOP 162 is connected to the output terminal 34a of frequency divider 34 and to the clock terminal of reference counter 40. The set terminal of FLIP-FLOP 162 is connected to terminal 34d of frequency divider 34. Output terminals 186 and 188 are connected across start winding 24 of motor 20. Output terminals 188 and 190 are connected across the alternating current source 30.

FIG. 9 shows a detailed circuit diagram of the power-on reset circuit 58. When power is initiated in the starting control circuit of the present invention, the power-on reset circuit delivers the power signal from terminal 119 through a resistor 192 and a zener diode 194 and an inverter 196 to an output terminal 198. The output terminal 198 is connected to the set terminal of FLIP-FLOP 144 in run-start latch circuit 50 and to the set terminal of FLIP-FLOP 122 in synchronizing circuit 46.

Figure 10:
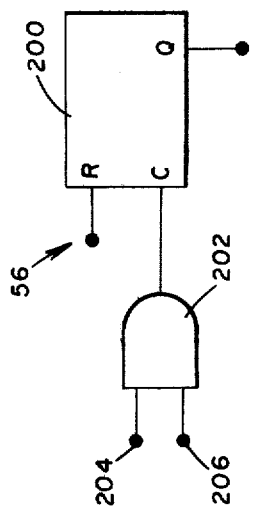
FIG. 10 shows a detailed circuit diagram of the protection circuit utilized in the starting control circuit of the present invention.

FIG. 10 shows a detailed circuit diagram of the protection circuit 58. Protection circuit 58 includes a counter 200 and an AND gate 202. Terminal 204 of AND gate 202 is connected to the reset terminal of FLIP-FLOP 116 and the output terminal of FLIP-FLOP 118 in gate circuit 38. Input terminal 206 of AND gate 202 is connected to the output terminal of FLIP-FLOP 144 in run-start latch circuit 50. The output of AND gate 202 is connected to the clock terminal of counter 200. The reset terminal of the counter 200 is connected to the output terminal of FLIP-FLOP 122 in synchronizing circuit 46. The output terminal of counter 200 is connected to an indicating circuit and to the reset terminal of FLIP-FLOP 144 in run-start latch circuit 50.

Figure 11:
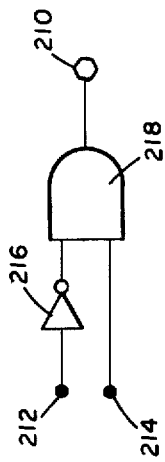
FIG. 11 shows an indicating circuit utilized in the starting control circuit of the present invention.

FIG. 11 shows an indicating circuit for producing an output signal at terminal 210 when the start winding 24 is disconnected from the circuit. Input terminal 212 is connected to the output terminal of counter 200 in protection circuit 58. Input terminal 214 is connected to the complementary output terminal of FLIP-FLOP 144 in run-start latch circuit 50. The signal on terminal 212 is connected to an inverter 216 which, in turn, is connected to an AND gate 218. The other input terminal of the AND gate 218 is connected directly to terminal 214. The output of AND gate 218 is connected to the output terminal 210.

The frequency divider 34, the reference counter 40, the latch circuit 42, and the main counter 48 are each formed from known, commercially available, counting circuits which are interconnected in a known manner.

Since the starting control circuit of the present invention utilizes MOS integrated circuit technology, the circuit operates at a very low power level which does not significantly add to the input power required by the motor. Since the circuit utilizes primarily digital components, it is both extremely accurate in operation and yet economical to manufacture. As was mentioned before, the circuit may be utilized over a wide range of motor sizes and will operate accurately over a wide range of line frequencies and motor voltages.

While there has been described what is at present considered to be the preferred embodiment of the present invention, it will be obvious to those skilled in the art that various changes and modifications may be made therein, without departing from the invention, and it is, therefore, aimed in the appended claims to cover all such changes and modifications as fall within the true spirit and scope of the invention.

We claim:

1. A starting control circuit for an alternating current motor having a run winding and a start winding and a mechanical rotational output comprising:
   an alternating current source;
   reference means for producing a reference signal;
   first control means responsive to said reference signal and the frequency of said alternating current source for producing a first control signal;
   sensor means for sensing a predetermined amount of rotational movement of said mechanical rotational output and producing a sensor signal indicative thereof;
   second control means responsive to said reference signal and said sensor signal for producing a second control signal and for comparing said first and second control signals and assuming first and second output states dependent on the relationship between said first and second control signals; and
   switch means connected to said second control means, said alternating current source and said start winding, for connecting and disconnecting said alternating current source and said start winding in response to the output state of said second control means.

2. A starting control circuit as set forth in claim 1, wherein said reference means includes means for producing pulses having a reference frequency.

3. A starting control circuit as set forth in claim 2, wherein said sensor signal includes a plurality of pulses, each pulse being indicative of a predetermined amount of rotational movement of said mechanical rotational output.

4. A starting control circuit as set forth in claim 3, wherein said first control means includes a first counting means for counting the number of said reference pulses produced during a predetermined number of cycles of said alternating current source and wherein said second control means includes second counting means for counting the number of said reference pulses produced during the time between a predetermined number of sensor signal pulses.

5. A starting control circuit as set forth in claim 4, wherein said first control signal is a count of the number of said reference pulses produced during a predetermined number of cycles of said alternating current source, wherein said first control means includes a latch circuit for storing said first control signal and wherein said second control signal is a count of the number of reference pulses produced during the time between a predetermined number of sensor signal pulses.

6. A starting control circuit as set forth in claim 5, wherein said second control signal is the complement of said first control signal so that when the motor is below the desired speed an overflow occurs in the second counting means, and an overflow signal in produced indicative thereof.

7. A starting control circuit as set forth in claim 6, further including a second latch circuit for receiving said overflow signal from said second control means and for producing first and second output signals, said first output signal being connected to said switch means for connecting and disconnecting said alternating current source and said start winding in response to the presence or absence of an overflow signal from said second control means.

8. A starting control circuit as set forth in claim 7, wherein said reference means further includes a frequency divider for producing a plurality of reference signals having different frequencies, one reference signal being connected to said first control means, said second counting means either being connected to one of said first reference signal and a second reference signal in response to the second output signal of said second latch circuit.

9. A starting control circuit as set forth in claim 1, wherein said switch means is a thyristor.

10. A starting control circuit as set forth in claim 1, wherein said sensor means includes a Hall Effect detection circuit.

11. A starting control circuit as set forth in claim 10, wherein said sensor means further includes a member mechanically connected to said mechanical and rotational output of said motor, said member having at least one magnet mounted in cooperative relationship with said member and with said Hall Effect detection circuit to activate said Hall Effect detection circuit when said member completes a predetermined amount of rotational movement.

12. A digital starting control circuit for an alternating current motor having a run winding and a start winding and a mechanical rotational output comprising:
an alternating current source;
reference signal producing means for producing pulses having a reference frequency;
first control means for counting the number of said reference pulses produced during a predetermined number of cycles of said alternating current source;
sensor means for sensing a predetermined amount of rotational movement of said mechanical rotational output and producing sensor pulse indicative thereof;
second control means for counting the number of said reference pulses produced during the time between a predetermined number of sensor pulses, and for comparing the counts in said first and second control means and assuming first and second output states dependent on the relationship between said counts; and
switch means connected to said second control means, said alternating current source and said start winding for connecting and disconnecting said alternating current source and said start winding in response to the output state of said second control means.

13. A digital starting control circuit as set forth in claim 12, wherein said reference signal producing means includes a reference oscillator, said reference oscillator producing an output at a first frequency.

14. A digital starting control circuit as set forth in claim 13, further including means connected to said reference oscillator for converting said first frequency output into a pair of signals having second and third frequencies.

15. A digital starting control circuit as set forth in claim 14, wherein said means for converting said reference oscillator output into a plurality of signals is a frequency divider.

16. A digital starting control circuit as set forth in claim 12, wherein said sensor means includes a Hall Effect detection circuit.

17. A digital starting control circuit as set forth in claim 16, wherein said sensor means further includes a member mechanically connected to said mechanical and rotational output of said motor, said member having at least one magnet mounted in cooperative relationship with said member and with said Hall Effect detection circuit to activate said Hall Effect detection circuit when said member completes a predetermined amount of rotational movement.

18. A digital starting control circuit as set forth in claim 12, wherein said first control means includes a first counting means for counting the number of reference pulses produced during a predetermined number of cycles of said alternating current source and further includes a latch circuit for storing the count of the number of reference pulses produced by a said first counting means.

19. A digital starting control circuit as set forth in claim 18, wherein said latch circuit further includes means for converting the output count from said first counting means to the complement of said first counting means output count.

20. A starting control circuit as set forth in claim 18, wherein said first control means further includes a gate circuit connected to said reference signal producing means and said alternating current source for delivering to said first counting means all the reference pulses produced during each cycle of alternating current produced by said alternating current source.

21. A digital starting control circuit as set forth in claim 20, wherein said second control means includes second counting means for counting the number of said reference pulses produced during the time between a predetermined number of sensor pulses and for receiving the output from said first latch circuit, said second counting means producing an overflow output signal whenever the sum of the count in said second counting means and said first latch circuit exceeds the capacity of said second counting means.

22. A digital starting control circuit as set forth in claim 21, wherein said second control means further includes a synchronizing circuit connected to said sensor means, said reference signal producing means, and said second counting means for synchronizing said sensor pulses with said reference pulses and delivering the synchronized sensor pulse signal to said second counting means.

23. A digital starting control circuit as set forth in claim 22, wherein said alternating current motor includes n poles and wherein a synchronized sensor pulse is delivered to said second counting means with each 360÷n degrees of rotation of said mechanical rotational output.

24. A digital starting control circuit as set forth in claim 21, further including a second latch circuit for receiving said overflow signal from said second counting means and for producing first and second output signals in response to the presence or absence of an overflow signal from said second counting means.

25. A digital starting control circuit as set forth in claim 24, further including a drive circuit connected to said second latch circuit for producing a plurality of gating pulses to said switch means during each cycle of said alternating current source in response to said first output signal.

26. A digital starting control circuit as set forth in claim 25, wherein each of the said gating pulses has a duration of approximately 3 microseconds and wherein the interval between adjacent gating pulses is approximately 190 microseconds.

27. A digital starting control circuit as set forth in claim 25, wherein said reference signal producing means further includes a frequency divider connected to said second latch circuit, said first control means and said second counting circuit for producing a pair of reference pulse signals having different frequencies, one reference pulse signal being connected to said first control means, said counting means being connected to one of said pair of reference pulse signals in response to the second output signal of said second latch circuit.

28. A digital starting control circuit as set forth in claim 12, wherein said switch means is a thyristor.

29. A digital starting control circuit as set forth in claim 28, wherein said thyristor is a triac.

30. A digital starting control circuit as set forth in claim 12, wherein said reference signal producing means includes a switching circuit responsive to the output state of said second control means for changing the reference signal to said second control means, thereby changing the relationship between said first and second counts when the output state of said second control means changes.

31. A digital starting control circuit as set forth in claim 24, wherein said reference signal producing means includes a switching circuit for receiving said second output signal from said second latch circuit for changing the reference signal to said second counting means, thereby changing the relationship between said first and second counts when said second output signal changes.

32. A digital starting control circuit as set forth in claim 12, further including means for causing said switch means to disconnect said start winding from said alternating current source in the event said mechanical rotational output fails to move a predetermined amount in a predetermined amount of time.

33. A digital starting control circuit for an alternating current motor having a run winding and a start winding and a mechanical rotational output comprising:
an alternating current source for delivering alternating current at a line frequency;
reference signal producing means for producing pulses having a reference frequency;
sensor means for sensing a predetermined amount of rotational movement of said mechanical rotational output and producing a sensor pulse indicative thereof;
control means connected to said alternating current source, said reference signal producing means and said sensor means and operating independently of any particular line frequency and any particular reference frequency for assuming a first output state when the output speed of said mechanical rotational output is below a predetermined level and for assuming a second output state when the output speed of said mechanical rotational output exceeds said predetermined level; and
switch means connected to said control means, said alternating current source and said start winding for connecting and disconnecting said alternating current source and said start winding in response to the output state of said control means.

34. A digital starting control circuit as set forth in claim 33, wherein said reference signal producing means includes a reference oscillator for producing an output at a first frequency, $f_{osc}$ and means connected to said reference oscillator for converting said first frequency output into at least a second reference signal having a frequency of $f_{osc} \div a$ and a third reference signal having a frequency of $f_{osc} \div b$, where a and b are predetermined constants, said control means assuming said first output state when $(1/2bS) > (1/a)$ and assuming said second output state when $1/2bS < 1/a$ where S = sensed motor speed divided by synchronous motor speed.

35. A digital starting control circuit as set forth in claim 34, wherein said reference signal producing means further includes a switching circuit responsive to the output state of said control means for delivering only said second reference signal to said control means when $S > (a/2b)$ and for delivering both said second and third reference signals to said control means when S drops below 0.5.

36. A digital starting control circuit as set forth in claim 12, further including an indicating circuit for producing an output signal when said start winding is disconnected from said alternating current source.

* * * * *